United States Patent [19]
Olney et al.

[11] Patent Number: 5,558,730
[45] Date of Patent: Sep. 24, 1996

[54] VEHICLE WHEEL INCLUDING SELF-INFLATING TIRE PUMP

[75] Inventors: Ross D. Olney, West Hills; David E. Schnelker, Agoura; William S. Griffin, Manhattan Beach, all of Calif.

[73] Assignee: Hughes Aircraft Company, Los Angeles, Calif.

[21] Appl. No.: 442,608

[22] Filed: May 17, 1995

Related U.S. Application Data

[63] Continuation of Ser. No. 147,250, Oct. 22, 1993, abandoned.

[51] Int. Cl.$^6$ .............................. B60C 23/12; F04B 31/00
[52] U.S. Cl. .......................... 152/418; 417/211; 417/233
[58] Field of Search .................................. 152/415, 418; 417/231, 233, 211

[56] References Cited

U.S. PATENT DOCUMENTS

| | | | |
|---|---|---|---|
| 1,254,903 | 1/1918 | Hall | 152/418 |
| 1,887,715 | 11/1932 | Hester | 417/233 |
| 4,269,252 | 5/1981 | Shapiro | 152/426 |
| 4,349,064 | 9/1982 | Booth | 152/418 |
| 4,840,212 | 6/1989 | Wei | 152/419 |
| 4,922,984 | 5/1990 | Dos'joub et al. | 152/415 |
| 5,052,456 | 10/1991 | Dos'joub et al. | 152/415 |
| 5,201,968 | 4/1993 | Renier | 152/418 |

FOREIGN PATENT DOCUMENTS

| | | |
|---|---|---|
| 2813601 | 10/1979 | Germany. |
| 69388 | 6/1945 | Norway. |

*Primary Examiner*—Michael W. Ball
*Assistant Examiner*—Francis J. Lorin
*Attorney, Agent, or Firm*—V. D. Duraiswamy; W. K. Denson-Low

[57] ABSTRACT

A self-inflating tire pump is integrally fixed to a wheel of a vehicle for automatically pumping air into an inflation region of a tire which is mounted on the wheel. The pump includes a piston which is movable radially outward in a cylinder by centrifugal force to draw air from the atmosphere into a compression chamber and is movable radially inward by a biasing element to compress the air in the compression chamber and pump it into the inflation region. The biasing element includes a surface of the piston which is exposed to air pressure in the inflation region, and prevents the piston from moving outward until the wheel rotates above a certain speed, thereby preventing contaminants such as water and dirt from entering the compression chamber during low speed operation of the vehicle in adverse terrain. A stopper mechanism prevents the piston from moving when the tire pressure is above a normal value, thereby reducing frictional wear of the pump.

30 Claims, 6 Drawing Sheets

VEHICLE WHEEL INCLUDING SELF-INFLATING TIRE PUMP

This is a continuation application of Ser. No. 08/147,250 filed Oct. 22, 1993, now abandoned.

BACKGROUND OF THE INVENTION

1. Field of the Invention

The present invention generally relates to automotive and other vehicles, and more specifically to a wheel for such a vehicle which includes a pump for automatically inflating a tire mounted on the wheel.

2. Description of the Related Art

Low tire pressure is a major cause of excessive fuel consumption, tire wear and impaired steerability. A normal tire will typically leak on the order of 25 percent of its pressure per year due to its inherent permeability. It is thus good practice to maintain tire pressure on a regular basis.

However, even checking tire pressure every few weeks may not prevent these adverse affects when a slow leak is present, and the leak may go undetected unless a careful record is maintained of how frequently the pressure in each tire has to be replenished. A fast leak or flat condition can rapidly cause damage to the tire and even render it unusable in a short period of time, but this condition may go unnoticed by an inexperienced driver until it is too late.

It is thus highly desirable to have some mechanism that automatically replenishes the tire pressure when it is too low. Prior art tire pumps which are mounted on vehicle wheels and utilize centrifugal force to automatically pump air from the atmosphere into a tire and thereby maintain the tire pressure at a predetermined value are known in the art per se, such as disclosed in U.S. Pat. No. 1,254,903, entitled "AUTOMATIC TIRE PUMP" issued Jan. 29, 1918 to C Hall, and U.S. Pat. No. 4,349,064, entitled "INERTIAL TIRE PRESSURE REGULATORS" issued Sep. 14, 1982 to G. Booth.

The Hall and Booth devices are two-stage pumps which each include a piston which is radially movable in a cylinder to draw air from the atmosphere into a primary chamber and pump air from a secondary chamber into the tire when the piston is moved outward by centrifugal force resulting from movement of the vehicle and rotation of its wheels. The piston is moved inward by a spring when the vehicle stops to transfer air from the primary chamber into the secondary chamber.

In order to keep the mass of the piston and the force and size of the spring within practical limits, the piston and spring must be made small enough that the piston will begin to move outward in response to a small centrifugal force resulting from a low vehicle speed.

This causes a problem when the vehicle is operated at low speed in the rain, and/or on terrain including loose particulate matter such as dirt or sand. If the pump does not have an inlet filter, operation under such adverse conditions can cause these contaminants to be drawn into the pump to clog the inlet and outlet valves and even be pumped into the tire. If the pump does have an inlet filter, the filter can become clogged. These conditions can render the pump inoperative.

Friction between the piston and the wall of the cylinder when the pump is operating causes wear and reduction of the service life of the pump. Since tires leak slowly under normal conditions, an automatic tire pump is only required to operate during a fraction of the time the vehicle is running to maintain the tire pressure at the normal value. However, prior art tire pumps operate continuously, and are thereby subjected to more wear than is necessary.

SUMMARY OF THE INVENTION

In accordance with the present invention, a pump is integrally fixed to a wheel of a vehicle for automatically pumping air into an inflation region of a tire which is mounted on the wheel.

The pump includes a piston which is movable radially outward in a cylinder by centrifugal force to draw air from the atmosphere into a compression chamber, and is movable radially inward by a biasing element to compress the air in the compression chamber and pump it into the inflation region.

The biasing element prevents the piston from moving outward until the wheel rotates above a certain speed, thereby preventing contaminants such as water and dirt from entering the compression chamber during low speed operation of the vehicle in adverse terrain.

The biasing element includes a surface of the piston which is exposed to the tire air pressure in the inflation region and has a surface area which is substantially equal to the surface area of the piston which is exposed to the compression chamber. A relatively weak spring assists the tire pressure in moving the piston inward.

This arrangement enables the piston to move only when the vehicle is moving faster than is possible in adverse terrain, and prevents water and particulate matter which are present in such terrain from being drawn into the pump and tire. This goal is achieved using a piston and spring which are small enough for practical application.

A stopper mechanism prevents the piston from moving when the tire pressure is above a normal value. This prevents the pump from operating when it is not actually needed, reducing frictional wear and increasing the service life of the pump.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
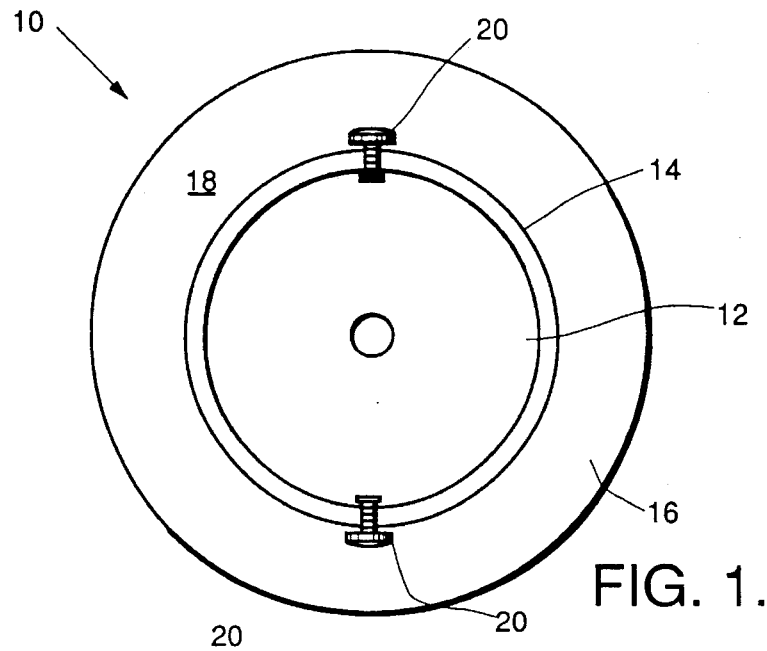
FIG. 1 is a simplified side elevation illustrating a wheel embodying the present invention and two self-inflating pumps for automatically pumping air into a tire mounted on the wheel.

In accordance with the present invention, a wheel 10 for a vehicle such as an automobile includes a body 12 having an outer peripheral rim 14 on which a tire 16 is mounted. An annular inflation region 18 is defined inside the tire 16 by the inner wall of the tire 16 and the rim 4. Two self-inflating tire pumps 20 embodying the invention are mounted on and extend through the rim 14 for pumping air from the atmosphere into the inflation region 18.

The two pumps 20 are illustrated as being mounted at diametrically opposed positions on the rim 14 to maintain balance of the wheel 10. However, it is within the scope of the invention to provide only one pump 20 in combination with an appropriate counterbalance (not shown), or three or more pumps 20 which are equally circumferentially spaced about the rim 14.

Figure 2:
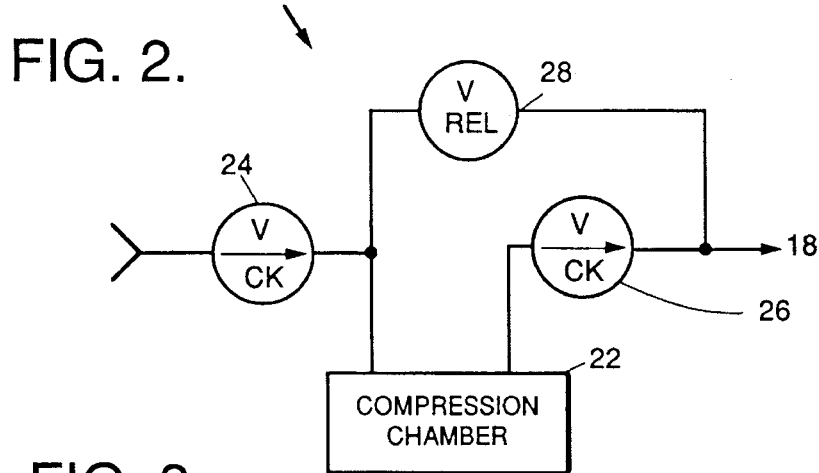
FIG. 2 is a schematic diagram illustrating one of the pumps of FIG. 1.

A schematic diagram of one of the pumps 20 is illustrated in FIG. 2. The pump 20 includes a compression chamber 22, an inlet valve 24 for transmitting air from the atmosphere into the compression chamber 22, and an outlet valve 26 for transmitting air from the compression chamber 22 into the inflation region 18 of the tire 16. The valves 24 and 26 are one-way or "check" valves, and can have any desired configuration.

In order to accommodate a progressive reduction in the efficiency of the pump 20 due to wear and aging of the components thereof, the pump 20 is designed to provide an outlet pressure which is in excess of the normal inflation pressure of the tire 16. For example, if the normal tire pressure is 35 psi, the pump 20 can be designed to have an outlet pressure of 50 psi.

For this reason, a pressure relief valve 28, also known as a bypass or "pop-off" valve, is connected between the inflation region 18 and the compression chamber 22 to prevent the pump 20 from overinflating the tire 16. If the normal tire pressure is 35 psi, the relief valve is designed to open when the tire pressure exceeds 35 psi to recirculate air pumped into the inflation region 18 by the pump 20 back into the compression chamber 22.

Figure 3:
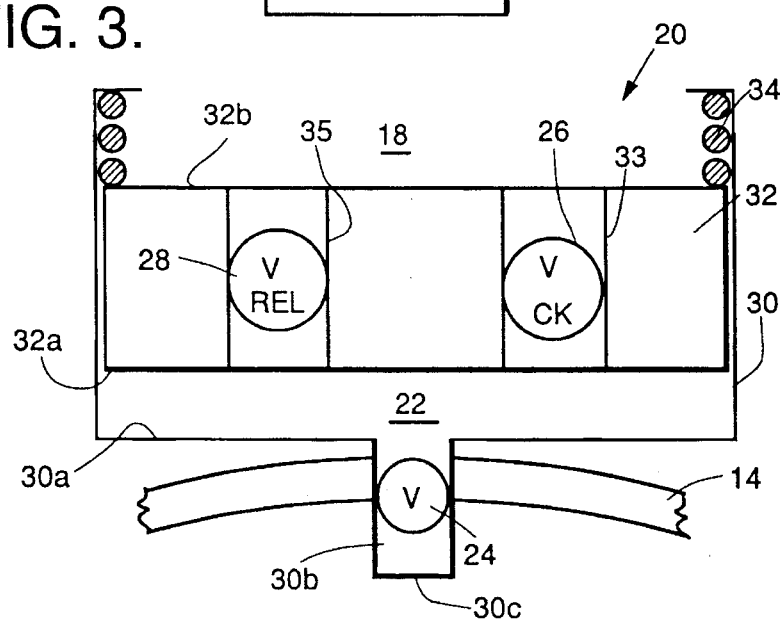
FIG. 3 is a simplified sectional diagram illustrating the pump of FIG. 2.

As illustrated in FIG. 3, the pump 20 further includes a radially extending cylinder 30 which is fixed to and extends through the rim 14, and is thereby integrally rotatable with the body 12 of the wheel 10. A piston 32 is radially movable in the cylinder 30 and is urged radially inward (downward as viewed in the drawing) by a weak compression spring 34 and the tire pressure. The compression chamber 22 is defined in the cylinder 30 between a radially inner surface 30a of the cylinder 30 and a radially inner surface 32a of the piston 32.

The inlet valve 24 is disposed in an inlet passageway 30b of the cylinder 30 which has a radially inner end 30c communicating with the atmosphere. The inlet valve 24 is normally closed, and opens when the air pressure in the compression chamber 22 is lower than atmospheric pressure.

The piston 32 has a radially outward (upper as viewed in the drawing) surface which is exposed to the tire pressure in the inflation region 18. An outlet passageway 33 extends through the piston 32, with the outlet valve 26 being disposed in the passageway 33. The outlet valve 26 is normally closed, and opens when the air pressure in the compression chamber 22 is higher than the tire pressure in the inflation region 18.

A bypass passageway 35 also extends through the piston 32, with the relief valve 28 being disposed in the passageway 35. The relief valve 28 is normally closed, and opens when the tire pressure in the inflation region 18 is higher than the air pressure in the compression chamber 22 plus the preload of an internal spring in the valve 28 which can be preset to any desired value.

When the vehicle on which the wheel 10 is mounted is at rest, the tire pressure acting on the surface 32b of the piston 32 in combination with the force of the spring 34 moves the piston 32 to a radially inward position (not shown) in which the surfaces 32a and 30a are in abutment and the volume of the compression chamber 22 is minimum.

When the vehicle is moving below a predetermined speed, for example 25 mph, centrifugal force urges the piston 32 to move radially outward against the biasing forces of the tire pressure and the spring 34. However, the piston 32 will not move as long as the centrifugal force is smaller than the inward biasing forces.

As the vehicle speed exceeds 25 mph and the centrifugal force acting on the piston 32 exceeds the inward biasing forces, the piston 32 moves radially outward, the inlet valve 24 opens, and air is drawn from the atmosphere through the inlet passageway 30b into the compression chamber 22. The piston 32 will reach a maximum outward position at another predetermined speed, for example 35 mph.

As the vehicle decelerates through 25 mph toward a stop, the centrifugal force acting on the piston 32 decreases toward zero and the piston 32 is moved radially inward by the tire pressure acting on the surface 32b and the force of the spring 34. The inlet valve 24 closes, and the outlet valve 26 opens when the pressure in the compression chamber 22 exceeds the tire pressure to pump air from the compression chamber 22 into the inflation region 18.

In this manner, the present pumps 20 automatically self-inflate or pump air into the inflation region 18 of the tire 16 to maintain the tire pressure at the desired value of 35 psi.

The earlier described prior art tire pumps depend entirely or almost entirely on spring force to move a piston to a radially inward position. The preload of the spring is sufficiently small to enable the piston to begin to move outward at a very low vehicle speed. If these pumps were adapted to operate only above a certain speed to prevent contaminants from entering the pump during low speed operation in adverse terrain, the spring would have to have a preload which is sufficiently high to prevent centrifugal force from moving the piston until the vehicle exceeds this speed.

The prior art pumps pump air into a tire on the radially outward stroke of the piston. During this stroke, the centrifugal force acting on the piston must be sufficient to overcome the preload of the spring in combination with the air pressure in the compression chamber. In order to pump, the air pressure in the compression chamber must exceed the tire pressure in the inflation region.

In order to generate the required centrifugal force under these conditions, the mass and size of the piston would have to be relatively large. The force and thereby the required size of the spring must also be relatively large.

This obstacle is overcome in accordance with the present invention. Rather than pumping on the radially outward stroke of the piston 32, the present pump 20 is designed to pump on the radially inward stroke of the piston 32. In addition, the surface area of the outer surface 32b of the piston 32 is substantially equal to the surface area of the inner surface 32a thereof.

More specifically, when the vehicle decelerates toward a stop, the tire pressure acting on the surface 32b of the piston 32 in combination with the force of the spring 34 moves the piston 32 radially inward. Assuming that the spring 34 is not present, an equilibrium condition would be reached at some intermediate position of the piston 32 at which the pressure in the compression chamber 22 becomes equal to the tire pressure.

Since the surface areas of the opposite surfaces 32a and 32b of the piston 32 are equal, there would be no net force on the piston 32 at this equilibrium position, and the inward movement of the piston 32 would stop without any air being pumped into the inflation region 18.

However, the spring 34 assists the tire pressure in urging the piston 32 inward. In accordance with the invention, the force of the spring 34 can be very small and still enable the pump 20 to pump air into the inflation region 18. It is merely necessary for the spring 34 to apply enough force to the piston 32 such that the pressure in the compression chamber 22 increases sufficiently above the tire pressure for the outlet valve 26 to open and enable air to be displaced by the piston 32 from the compression chamber 22 into the inflation region 18.

The size and force of the present spring 34 are therefore much smaller than a comparable spring in the prior art arrangement. On the outward stroke of the piston 32, centrifugal force must overcome the tire pressure as in the prior art. However, since the force of the spring 34 is smaller than that of the prior art spring, centrifugal force is required to overcome a smaller inward biasing force than in the prior art.

The mass and size of the present piston 32 required to develop the required centrifugal force are therefore much smaller than in the prior art, enabling the present pump 20 to be embodied using a spring and piston which are sufficiently small for practical application.

Figure 4:
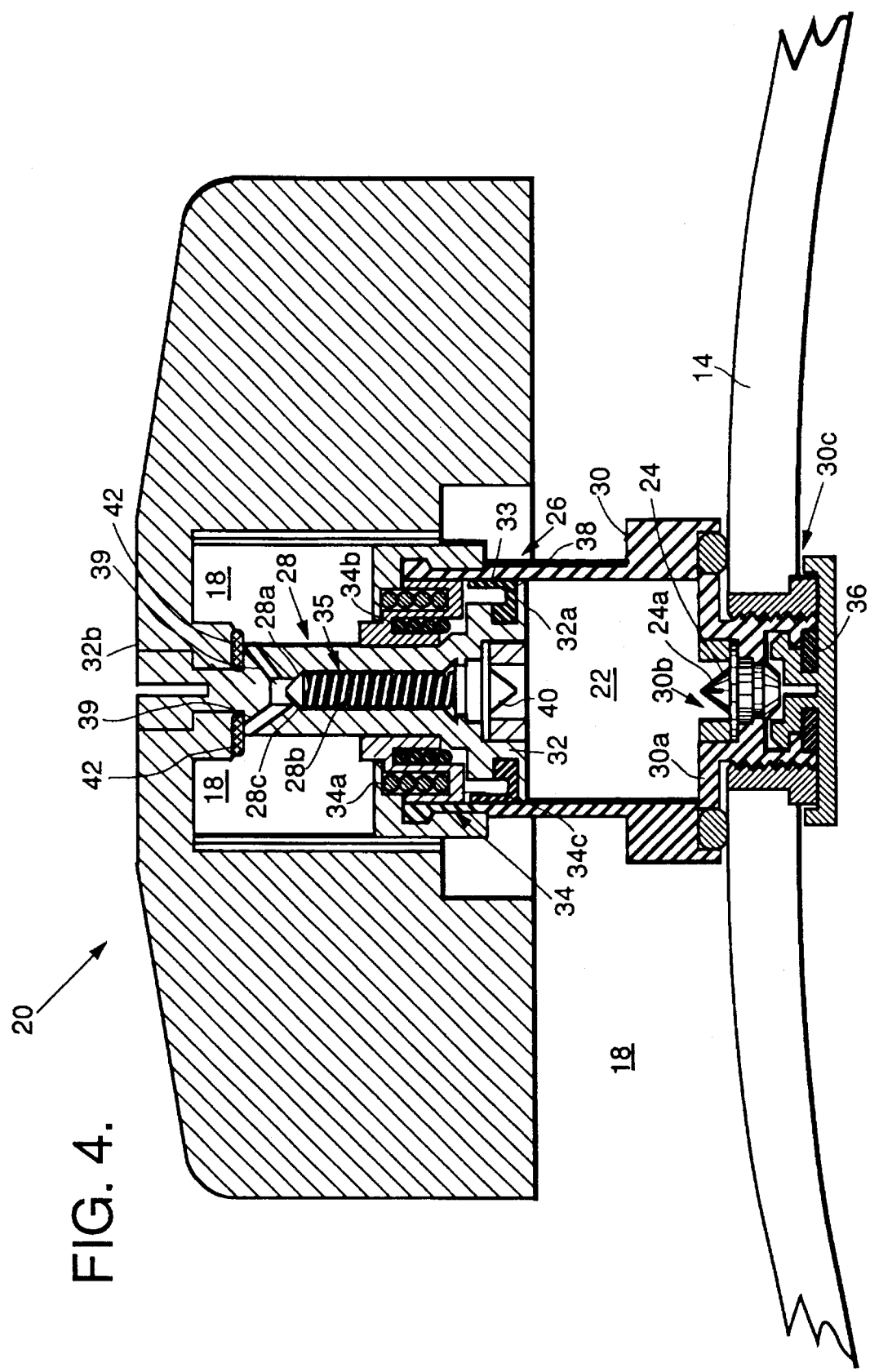
FIGS. 4 and 5 are vertical sectional views illustrating the pump of FIGS. 2 and 3 in a radially outer position and a radially inner position respectively.
Figure 5:
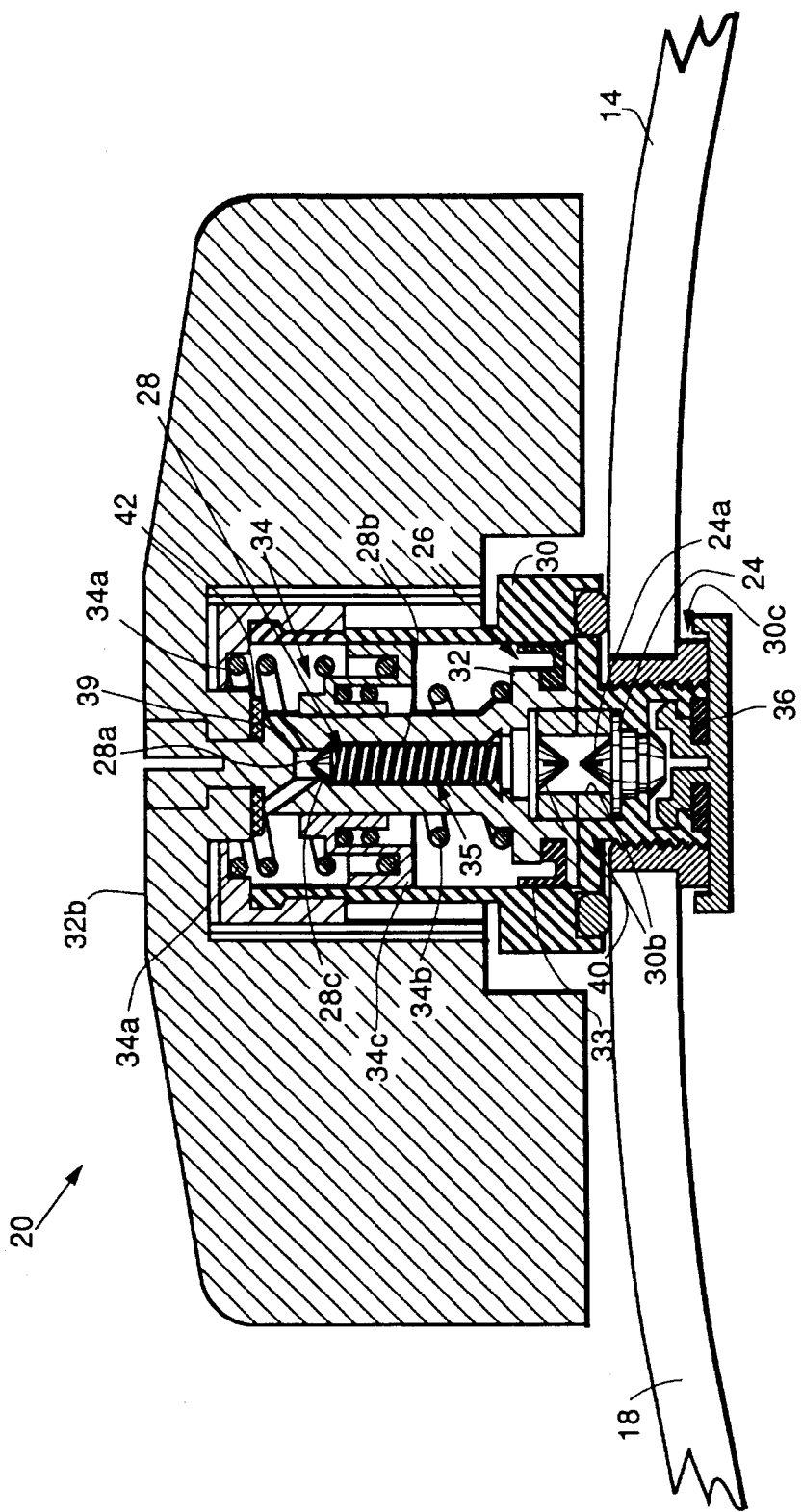

The present pump 20 is illustrated in more detail in FIGS. 4 and 5, in the outermost and innermost positions of the piston 32 respectively. The inlet valve 24 is illustrated as being a Supravalve having a conical shape with two intersecting cross-cuts, although only one cross-cut 24a is visible in the drawing. An air filter 36 is provided at the inlet end 30c of the inlet passageway 30b.

The outlet valve 26 is illustrated as being embodied by a cup seal 38 which is carried by a groove in the piston 32 and has a generally U-shaped cross-section which opens radially outward. The outer edge of the seal 38 normally engages with the inner wall of the cylinder 30 to provide a seal between the piston 32 and the cylinder 30 when the pressure in the compression chamber 22 is lower than the tire pressure.

The outer edge of the seal 38 is resiliently moved away from the wall of the cylinder 30 when the piston 32 moves inward to pump air from the compression chamber 22 into the inflation region 18. In this condition, the pressure in the compression chamber 22 exceeds the tire pressure. The outlet passageway 33 is created as an annular space between the seal 38 and the wall of the cylinder 30. Air flows through this annular space from the compression chamber 22 into the inflation region 18.

The spring 34 is illustrated as including two sections 34a and 34b and a generally annular spring seat 34c which engages with the inner end of the section 34a and the outer end of the section 34b to provide a connection between the sections 34a and 34b. This arrangement reduces the length of the spring 34 while providing the same force as compared with a single spring.

The piston 32 has a generally mushroom shape in order to increase the mass thereof. The relief valve 28 includes a valve element 28a which is urged by a compression spring 28b into engagement with a spring seat 28c to normally block the bypass passageway 35.

A check valve 40, illustrated as being a Supravalve having cross-cuts 40a, is provided at the inner end of the passageway 32d to prevent air from entering the bypass passageway 35 from the compression chamber 22. The bypass passageway 35 is connected to the inflation region 18 by connecting passageways 39. A filter 42 is provided at the inlet ends of the connecting passageways 39.

The relief valve 28 is normally closed since the element 28a is urged against the spring seat 28c by the spring 28c. However, when the tire pressure as transmitted through the connecting passageways 39 to the valve element 28a exceeds the preload of the spring 28b (which is set for 35 psi), the valve element 28a disengages from the spring seat 28c to bypass air from the inflation region 18 through the connecting passageways 39, bypass passageway 35 and valve 40 into the compression chamber 22.

Figure 6:
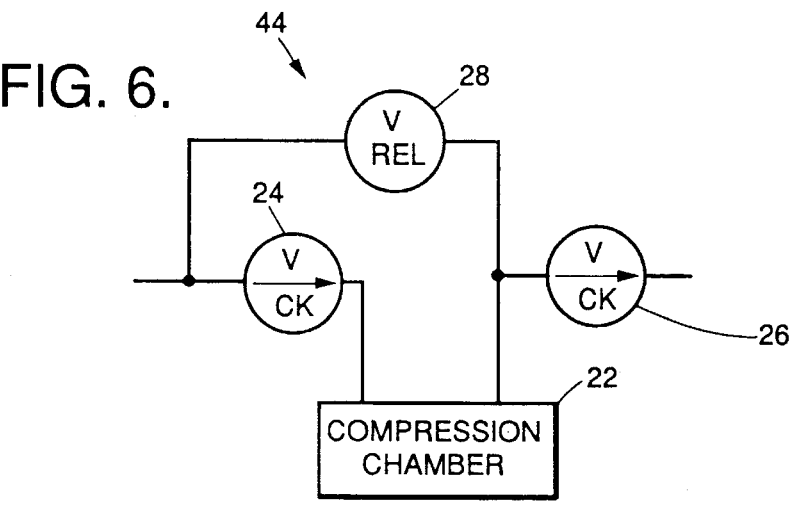
FIG. 6 is a schematic diagram illustrating another pump embodying the invention.
Figure 7:
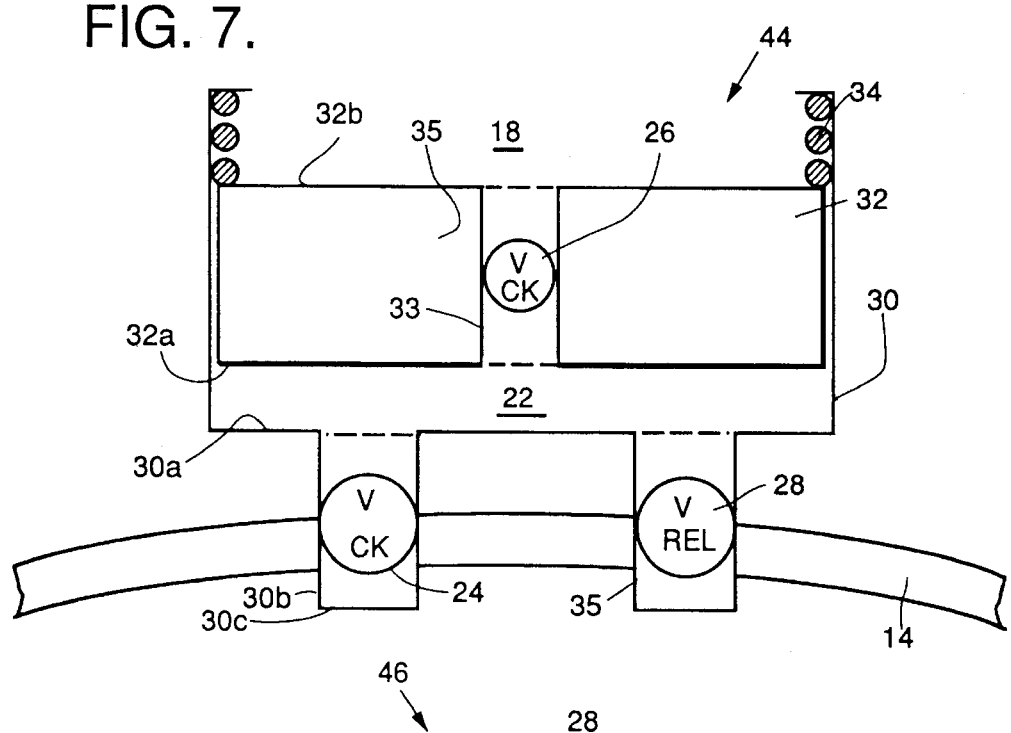
FIG. 7 is a simplified sectional diagram illustrating the pump of FIG. 6.

It is within the scope of the invention to provide different configurations of the relief valve 28. FIGS. 6 and 7 illustrate a self-inflating tire pump 44 embodying the present invention in which the relief valve 28 is connected between the compression chamber 22 and the atmosphere. This arrangement enables the tire 16 to be overinflated if desired.

Figure 8:
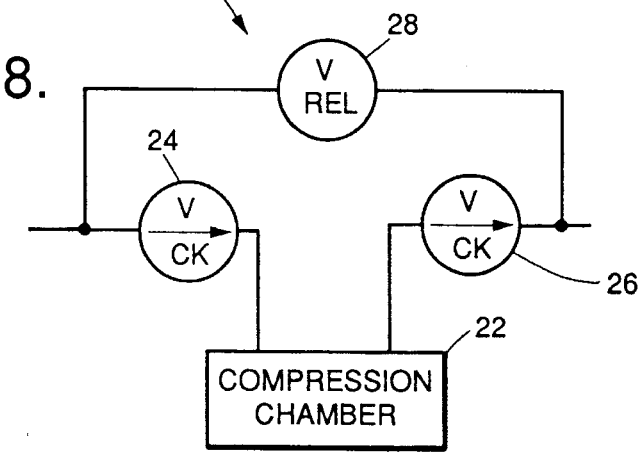
FIG. 8 is a schematic diagram illustrating another pump embodying the invention.
Figure 9:
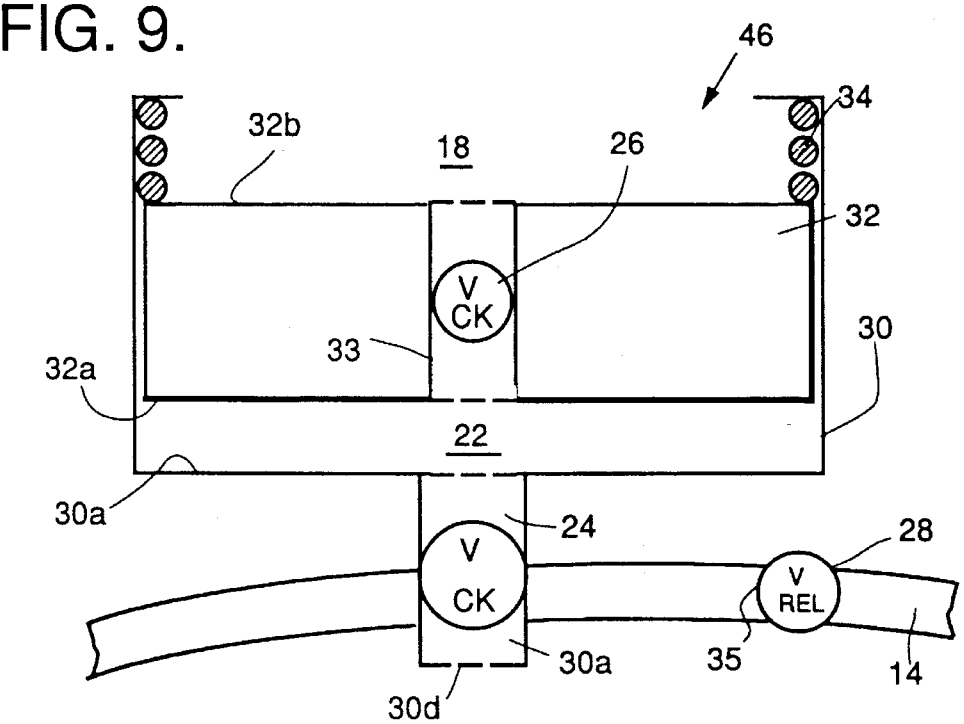
FIG. 9 is a simplified sectional diagram illustrating the pump of FIG. 8.

FIGS. 8 and 9 illustrate a self-inflating tire pump 46 of the invention in which the relief valve 28 is connected between the inflation region 18 and the atmosphere. This arrangement enables the relief valve 28 to be relocated away from the piston 32 and cylinder 30 to reduce the size thereof. The relief valve 28 is illustrated in FIGS. 8 and 9 as extending through the rim 14.

Figure 10:
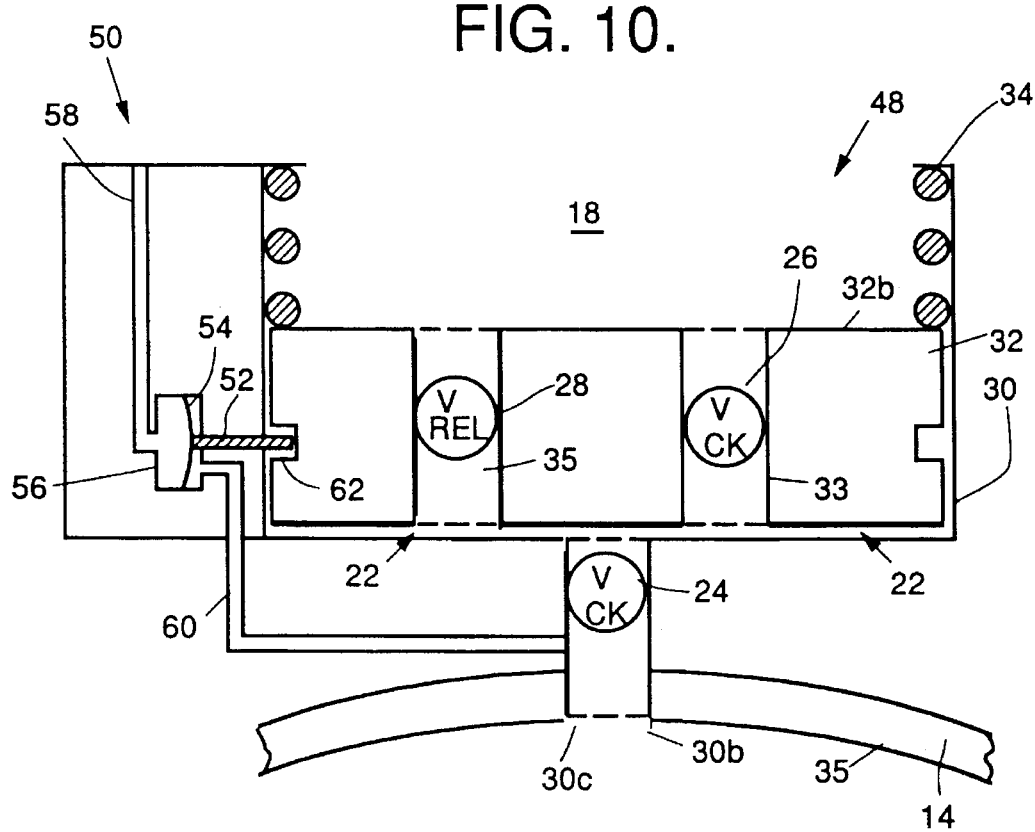
FIGS. 10 and 11 are simplified sectional diagrams illustrating the pump of FIGS. 2 and 3 as additionally provided with a stopper mechanism in a radially inward locked position and a radially outward unlocked position respectively.
Figure 11:
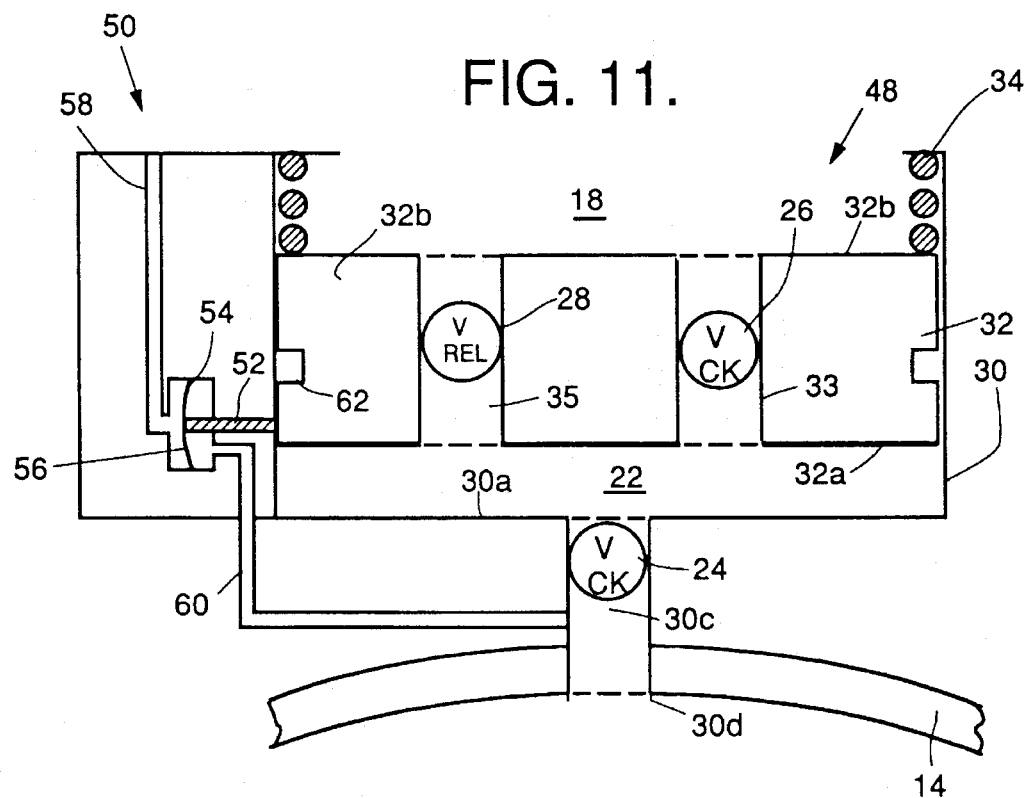

As discussed above, prior art automatic tire pumps operate continuously even if the tire pressure is at a normal value. These pumps are therefore subjected to continuous wear, which reduces their efficiency and service life. FIGS. 10 and 11 illustrate another self-inflating tire pump 48 embodying the present invention which operates only when it is required to pump air into the tire 16.

The pump 48 is similar to the pump 20, except that it further includes a stopper mechanism 50. A stopper element 52 is attached at one end to an actuator in the form of a bistable snap-action disk 54. The disk 54 is retained at its periphery in a chamber 56 which communicates with the inflation region 18 on one side of the disk 54 through a passageway 58, and with the atmosphere on the opposing side of the disk 54 through a passageway 60.

In the position of FIG. 10, the vehicle is stopped or moving at low speed, and the piston 32 is moved to its most radially inward position. The tire pressure is above its normal value. In this case, the disk 54 is snapped toward the piston 32 to one of its bistable positions, and the stopper element 52 engages in a circumferential groove 62 formed in the piston 32.

The element 52 prevents the piston 32 from moving outward at any speed of the vehicle, thereby eliminating frictional wear between the piston 32 and the cylinder 30 when the pump 48 is not required to pump air into the tire 16.

When the tire pressure drops below its normal value as illustrated in FIG. 11, the disk 54 is snapped away from the piston 32 to its other bistable position, and the element 52 disengages from the groove 62. This enables the piston 32 to move outward as illustrated.

Figure 12:
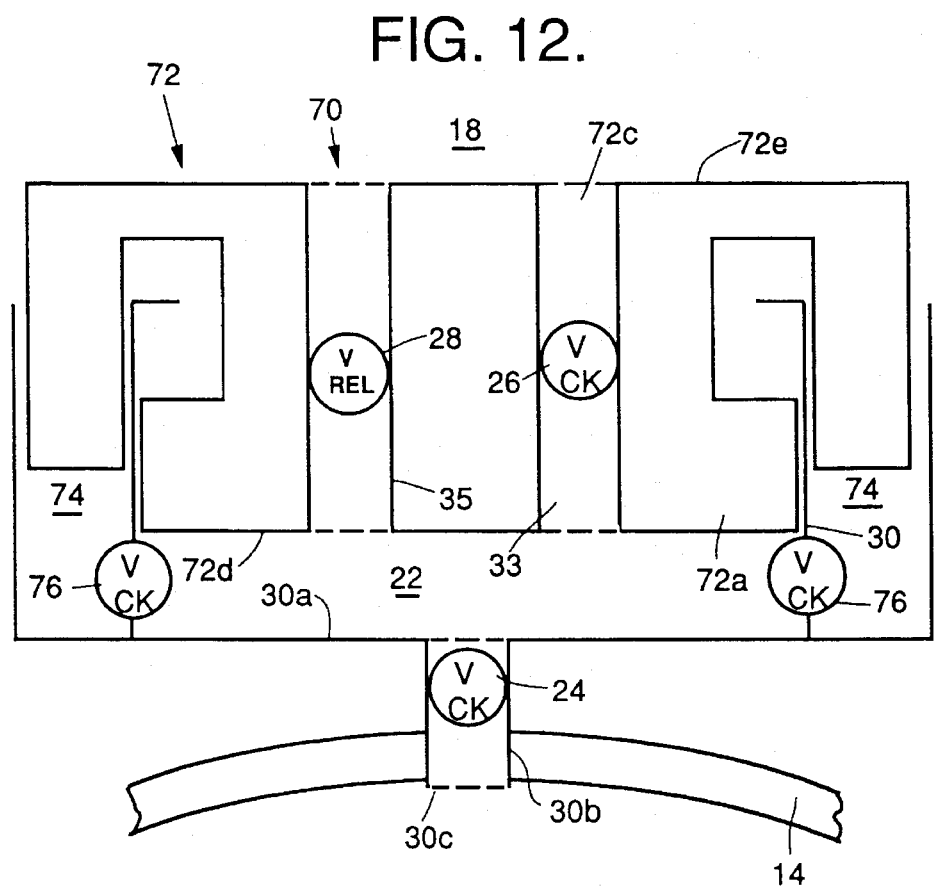
FIG. 12 is a simplified sectional diagram illustrating yet another pump embodying the invention.

FIG. 12 illustrates another self-inflating tire pump 70 embodying the present invention which enables the spring 34 to be eliminated. The piston 32 is replaced by a generally mushroom shaped piston 72 including a base 72a which is sealingly movable in the cylinder 30, an annular head 72b which is sealingly slidable in an annular chamber 74 and a neck 72c which connects the base 72a and the head 72b.

The outlet passageway 33 and the bypass passageway 35 extend through the neck 72c. The radially inner portion of the chamber 74 communicates with the compression chamber 22 via one or more check valves 76. The valves 76 maintain the chamber 74 at substantially atmospheric pressure by opening during the upward (inlet) stroke of the piston 72 when the pressure in the compression chamber 22 is negative.

A radially inner surface 72d of the piston 72 is exposed to the air pressure in the compression chamber 22, whereas a radially outer surface 72e of the piston 72 is exposed to the tire pressure in the inflation region 18. In accordance with the invention, the surface area of the outer surface 72e is made larger than the surface area of the inner surface 72d by an amount corresponding to the force of the spring 34 in the embodiments of the invention described above.

More specifically, the surface area of the inner surface 72d consists of the surface area of the base 72a, whereas the surface area of the outer surface 72e consists of the surface area of the base 72a plus the surface area of the extension 72b. The tire pressure acts on the outer surface 72e, whereas the air pressure in the compression chamber 22, which has a maximum value substantially equal to the tire pressure, acts on the inner surface 72d.

Since the surface area of the outer surface 72e is larger than the surface area of the inner surface 72d, and force is equal to the product of surface area and pressure, the inward force exerted on the piston 72 by the tire pressure will always exceed the outward force exerted on the piston 72 by the air pressure in the chamber 22.

The relative surface areas of the surfaces 72d and 72e are selected to create an inward differential force on the piston 72 such that the centrifugal force required to overcome the differential force and begin to move the piston 72 outward occurs at the desired vehicle speed of, for example, 25 mph.

The illustrated arrangement including the check valves 76 enables the head 72b to be maintained in sealing engagement with the wall of the chamber 74 using an inexpensive seal such as an O-ring (not shown). Alternatively, although not specifically illustrated, the chamber 74 can be connected directly to the atmosphere through a passageway extending through the rim 14. In this case, a positive seal such as a diaphragm is required between the head 72b and the wall of the chamber 22 to prevent leakage from the inflation region 18 through the chamber 74 to the atmosphere.

While several illustrative embodiments of the invention have been shown and described, numerous variations and alternate embodiments will occur to those skilled in the art, without departing from the spirit and scope of the invention.

For example, the stopper mechanism 50 illustrated in FIGS. 10 and 11 can be adapted for use with types of self-inflating tire pumps other than those explicitly described and illustrated, for example the above referenced pumps of Hall and Booth.

Accordingly, it is intended that the present invention not be limited solely to the specifically described illustrative embodiments. Various modifications are contemplated and can be made without departing from the spirit and scope of the invention as defined by the appended claims.

We claim:

1. A pump for pumping air from the atmosphere through a vehicle wheel rim into a vehicle tire interior, comprising:

a cylinder having a closed end adapted for connection to said wheel rim with said cylinder extending radially into said tire interior and terminating in an open end which communicates with said tire interior;

a piston slidably received in said cylinder;

a biasing element arranged to urge said piston towards said closed end;

an inlet valve positioned at said cylinder closed end and arranged to communicate with said atmosphere, said inlet valve configured to block airflow from said cylinder and permit airflow into said cylinder as said piston moves towards said open end in response to centrifugal force; and an outlet valve carried by said piston and arranged to communicate with said tire interior, said outlet valve configured to block airflow into said cylinder and permit airflow from said cylinder as said cylinder moves towards said closed end in response to said biasing element.

2. A pump as in claim 1, wherein said biasing element comprises a spring.

3. A pump as in claim 1, further including a relief valve carried by said piston and arranged to communicate with said tire interior, said relief valve configured to permit airflow into said cylinder and block airflow from said cylinder.

4. A pump as in claim 1, further including a relief valve positioned at said closed end and arranged to communicate with said atmosphere, said relief valve configured to permit airflow from said cylinder and block airflow into said cylinder.

5. A pump as in claim 1, wherein said cylinder has an interior wall and said outlet valve includes a resilient, annular seal carried by said piston and arranged to engage said wall to block airflow into said cylinder and move away from said wall to permit airflow from said cylinder.

6. A pump s in claim 1, further including a mass member which has a mass greater than the mass of said piston, said mass member connected to said piston to enhance the response of said piston to centrifugal force.

7. A vehicle wheel, comprising:

a vehicle wheel rim configured to receive a vehicle tire having a tire interior; and a pump for pumping air from the atmosphere through said wheel rim into said tire interior, including;

a cylinder having a closed end which is connected to said wheel rim with said cylinder extending radially into said tire interior and terminating in an open end which communicates with said tire interior;

a piston slidably received in said cylinder;

a biasing element arranged to urge said piston towards said closed end an inlet valve positioned at said cylinder closed end and arranged to; communicate with said atmosphere, said inlet valve configured to block airflow from said cylinder and permit airflow into said cylinder as said piston moves towards said open end in response to centrifugal force; and an outlet valve carried by said piston and arranged to communicate with said tire interior, said outlet valve configured to block airflow into said cylinder and permit airflow from said cylinder as said cylinder moves towards said closed end in response to said biasing element.

8. A vehicle wheel as in claim 7, wherein said biasing element comprises a spring.

9. A vehicle wheel as in claim 7, further including a relief valve carried by said piston and arranged to communicate with said tire interior, said relief valve configured to permit airflow into said cylinder and block airflow from said cylinder.

10. A vehicle wheel as in claim 7, further including a relief valve positioned at said closed end and arranged to communicate with said atmosphere, said relief valve configured to permit airflow from said cylinder and block airflow into said cylinder.

11. A vehicle wheel as in claim 7, wherein said cylinder has an interior wall and said outlet valve includes a resilient, annular seal carried by said piston and arranged to engage said wall to block airflow into said cylinder and move away from said wall to permit airflow from said cylinder.

12. A vehicle wheel as in claim 7, further including a mass member which has a mass greater than the mass of said piston, said mass member connected to said piston to enhance the response of said piston to centrifugal force.

13. A pump for pumping air from the atmosphere through a vehicle wheel rim into a vehicle tire interior, comprising:

a cylinder having a closed end adapted for connection to said wheel rim with said cylinder extending radially into said tire interior and terminating in an open end which communicates with said tire interior;

a piston slidably received in said cylinder, said piston having a first surface directed towards said closed end and a second surface exposed to said tire interior, said piston configured so that said first surface has a first area and said second surface has a second area greater than said first area;

an inlet valve positioned at said cylinder closed end and arranged to communicate with said atmosphere, said inlet valve configured to block airflow from said cylinder and permit airflow into said cylinder as said piston moves towards said open end in response to centrifugal force; and an outlet valve carried by said piston and arranged to communicate with said tire interior, said outlet valve configured to block airflow into said cylinder and permit airflow from said cylinder as said cylinder moves towards said closed end in response to differential pressures on said first and second surfaces.

14. A pump as in claim 13, further including a relief valve carried by said piston and arranged to communicate with said tire interior, said relief valve configured to permit airflow into said cylinder and block airflow from said cylinder.

15. A pump as in claim 13, further including a relief valve positioned at said closed end and arranged to communicate with said atmosphere, said relief valve configured to permit airflow from said cylinder and block airflow into said cylinder.

16. A pump as in claim 13, wherein said cylinder has an interior wall and said outlet valve includes a resilient, annular seal carried by said piston and arranged to engage said wall to block airflow into said cylinder and move away from said wall to permit airflow from said cylinder.

17. A pump as in claim 13, further including:

an annular chamber surrounding said cylinder;

an annular head defined by said piston and sealingly received in said chamber; and a chamber valve positioned between said cylinder and said annular chamber, said chamber valve configured to permit airflow from said annular chamber to said cylinder and block airflow from said cylinder to said annular chamber.

18. A vehicle wheel, comprising:

a vehicle wheel rim configured to receive a vehicle tire having a tire interior; and a pump for pumping air from the atmosphere through said wheel rim into said tire interior, including:

a cylinder having a closed end which is connected to said wheel rim with said cylinder extending radially into said tire interior and terminating in an open end which communicates with said tire interior;

a piston slidably received in said cylinder, said piston having a first surface directed towards said closed end and a second surface exposed to said tire interior, said piston configured so that said first surface has a first area and said second surface has a second area greater than said first area;

an inlet valve positioned at said cylinder closed end and arranged to communicate with said atmosphere, said inlet valve configured to block airflow from said cylinder and permit airflow into said cylinder as said piston moves towards said open end in response to centrifugal force; and an outlet valve carried by said piston and arranged to communicate with said tire interior, said outlet valve configured to block airflow into said cylinder and permit airflow from said cylinder as said cylinder moves towards said closed end in response to differential pressures on said first and second surfaces.

19. A vehicle wheel as in claim 18, further including a relief valve carried by said piston and arranged to communicate with said tire interior, said relief valve configured to permit airflow into said cylinder and block airflow from said cylinder.

20. A vehicle wheel as in claim 18, further including a relief valve positioned at said closed end and arranged to communicate with said atmosphere, said relief valve configured to permit airflow from said cylinder and block airflow into said cylinder.

21. A vehicle wheel as in claim 18, wherein said cylinder has an interior wall and said outlet valve includes a resilient, annular seal carried by said piston and arranged to engage said wall to block airflow into said cylinder and move away from said wall to permit airflow from said cylinder.

22. A vehicle wheel as in claim 18, further including:

an annular chamber surrounding said cylinder;

an annular head defined by said piston and sealingly received in said chamber; and a chamber valve positioned between said cylinder and said annular chamber, said chamber valve configured to permit airflow from said annular chamber to said cylinder and block airflow from said cylinder to said annular chamber.

23. A pump for pumping air into an inflation region of a tire which is mounted on a wheel, comprising:

a substantially radially extending cylinder which is adapted to be fixed to the wheel for integral rotation therewith;

a piston which is movable in the cylinder;

a variable volume compression chamber which is defined in the cylinder between radially inner surfaces of the cylinder and the piston;

biasing means for urging the piston radially inward;

an inlet valve for transmitting air from the atmosphere into said compression chamber when the piston is moved radially outward against the biasing means by centrifugal force resulting from rotation of the wheel; and an outlet valve for transmitting air from said compression chamber into the inflation region when the piston is moved radially inward by the biasing means, and a stopper mechanism for preventing the piston from moving when air pressure in said inflation region is above a predetermined pressure.

24. A pump as in claim 23, in which the stopper mechanism comprises:

a stopper element which is movable between a locking position in which the stopper element engages with and prevents the piston from moving, and an unlocking position in which the stopper element disengages from the piston; and an actuator which is responsive to said air pressure for moving the stopper element to the locking position when said air pressure is above said predetermined pressure and moving the stopper element to the unlocking position when said air pressure is below said predetermined pressure.

25. A pump as in claim 24, in which the actuator comprises an actuator element for moving the stopper element between said locking position and said unlocking position, the actuator element having a first surface communicating with said inflation region and an opposing second surface communicating with the atmosphere.

26. A pump as in claim 25, in which the actuator element comprises a bistable disk which snaps between said locking position and said unlocking position in accordance with said air pressure.

27. A vehicle wheel comprising:

a circular body for mounting a tire thereon; and a pump for pumping air into an inflation region of the tire, including:

a substantially radially extending cylinder which is fixed to the body for integral rotation therewith;

a piston which is movable in the cylinder;

a variable volume compression chamber which is defined in the cylinder between radially inner surfaces of the cylinder and the piston;

a biasing means for urging the piston radially inward;

an inlet valve for transmitting air from the atmosphere into said compression chamber when the piston is moved radially outward against the biasing means by centrifugal force resulting from rotation of the wheel; and an outlet valve for transmitting air from said compression chamber into said inflation region when the piston is moved radially inward by the biasing means, and a stopper mechanism for preventing the piston from moving when air pressure in said inflation region is above a predetermined pressure.

28. A wheel as in claim 27, in which the stopper mechanism comprises:

a stopper element which is movable between a locking position in which the stopper element engages with and prevents the piston from moving and an unlocking position in which the stopper element disengages from the piston; and an actuator which is responsive to said air pressure for moving the stopper element to the locking position when said air pressure is above said predetermined pressure, and moving the stopper element to the unlocking position when said air pressure is below said predetermined pressure.

29. A pump for pumping air from the atmosphere through a vehicle wheel rim into a vehicle tire interior:, comprising:

a cylinder having a closed end adapted for connection to said wheel rim with said cylinder extending radially into said tire interior and terminating in an open end which communicates with said tire interior;

a piston slidably received in said cylinder;

a biasing element arranged to urge said piston towards said closed end;

an inlet valve positioned at said cylinder closed end and arranged to communicate with said atmosphere, said inlet valve configured to block airflow from said cylinder and permit airflow into said cylinder as said piston moves towards said open end open response to centrifugal force;

an outlet valve carried by said piston and arranged to communicate with said tire interior, said outlet valve configured to block airflow into said cylinder and permit airflow from said cylinder as said cylinder moves towards said closed end in response to said biasing element;

an actuator which is arranged to be movably responsive to a differential pressure between said tire interior and said atmosphere; and a stopper element, responsive to said actuator, which is configured to engage and disengage said piston.

30. A vehicle wheel, comprising:

a vehicle wheel rim configured to receive a vehicle tire having a tire interior; and a pump for pumping air from the atmosphere through said wheel rim into said tire interior, including:

a cylinder having a closed end which is connected to said wheel rim with said cylinder extending radially into said tire interior and terminating in an open end which communicates with said tire interior;

a piston slidably received in said cylinder;

a biasing element arranged to urge said piston towards said closed end;

an inlet valve positioned at said cylinder closed end and arranged to communicate with said atmosphere, said inlet valve configured to block airflow from said cylinder and permit airflow into said cylinder as said piston moves towards said open end in response to centrifugal force;

an outlet valve carried by said piston and arranged to communicate with said tire interior, said outlet valve configured to block airflow into said cylinder and permit airflow from said cylinder as said cylinder moves towards said closed end in response to said biasing element;

an actuator which is arranged to be movably responsive to a differential pressure between said tire interior and said atmosphere; and a stopper element, responsive to said actuator, which is configured to engage and disengage said piston.

* * * * *